(12) United States Patent
Werner et al.

(10) Patent No.: US 10,111,229 B2
(45) Date of Patent: *Oct. 23, 2018

(54) MULTI-SUBCARRIER SYSTEM WITH MULTIPLE NUMEROLOGIES

(71) Applicant: TELEFONAKTIEBOLAGET LM ERICSSON (PUBL), Stockholm (SE)

(72) Inventors: Karl Werner, Segeltorp (SE); Ning He, Sollentuna (SE); Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,968

(22) Filed: Oct. 16, 2017

(65) Prior Publication Data

US 2018/0124791 A1 May 3, 2018

Related U.S. Application Data

(63) Continuation of application No. 15/446,671, filed on Mar. 1, 2017, now Pat. No. 9,820,281.

(Continued)

(51) Int. Cl.
*H04W 72/00* (2009.01)
*H04W 72/04* (2009.01)
(Continued)

(52) U.S. Cl.
CPC ....... *H04W 72/0453* (2013.01); *H04L 5/0007* (2013.01); *H04W 72/042* (2013.01);
(Continued)

(58) Field of Classification Search
CPC ............ H04W 72/0453; H04W 72/042; H04L 5/0007; H04L 27/2604; H04L 5/001; H04L 27/265
See application file for complete search history.

(56) References Cited

U.S. PATENT DOCUMENTS

2008/0233965 A1   9/2008 Kent et al.
2009/0125363 A1   5/2009 Frederiksen et al.
(Continued)

OTHER PUBLICATIONS

Ericsson: "Feasibility of Mixing Numerology in an OFDM System," 3GPP TSG RAN WG1 Meeting #84bis; R1-163224; Busan, Apr. 11-15, 2016.
(Continued)

*Primary Examiner* — Ajit Patel

(57) ABSTRACT

A method of operating a user equipment comprises addressing multi-subcarrier system resources using multiple different numerologies available within a single carrier, the multiple different numerologies comprising a first numerology having resource blocks (RBs) with a first bandwidth and a first subcarrier spacing, $\Delta f1$, and a second numerology having RBs with a second bandwidth and a second subcarrier spacing, $\Delta f2$, which is different from $\Delta f1$, wherein the first numerology is aligned in the frequency domain relative to a frequency reference, Fref, according to $m*\Delta f1+Fref$ and the second numerology is aligned in the frequency domain relative to the frequency reference, Fref, according to $n*\Delta f2+Fref$, where m and n are integers. The method further comprises transmitting and/or receiving information within the single carrier according to the at least one of the multiple different numerologies.

20 Claims, 16 Drawing Sheets

Related U.S. Application Data

(60) Provisional application No. 62/336,302, filed on May 13, 2016.

(51) Int. Cl.
    *H04L 27/26*     (2006.01)
    *H04L 5/00*     (2006.01)

(52) U.S. Cl.
    CPC .......... *H04L 5/001* (2013.01); *H04L 27/2604* (2013.01); *H04L 27/265* (2013.01)

(56) References Cited

U.S. PATENT DOCUMENTS

| | | |
|---|---|---|
| 2010/0158147 A1 | 6/2010 | Zhang et al. |
| 2010/0215011 A1 | 8/2010 | Pan et al. |
| 2011/0096693 A1 | 4/2011 | Astely et al. |
| 2014/0192763 A1* | 7/2014 | Eriksson ........... H04W 72/1284 370/329 |
| 2014/0241232 A1* | 8/2014 | Damji ................. H04L 25/0204 370/312 |
| 2015/0201368 A1 | 7/2015 | Cudak et al. |
| 2015/0358920 A1* | 12/2015 | Sorrentino .......... H04W 52/146 455/522 |
| 2016/0294498 A1 | 10/2016 | Ma et al. |
| 2016/0360525 A1* | 12/2016 | Cheng ..................... H04L 5/001 |
| 2017/0156140 A1* | 6/2017 | Islam ................. H04L 27/2601 |
| 2017/0164350 A1* | 6/2017 | Sun ................... H04W 72/0413 |

OTHER PUBLICATIONS

Ericsson: "Numerology for NR," 3GPP TSG RAN WG1 Meeting #84bis, R1-163227; Busan, Apr. 11-15, 2016.

* cited by examiner

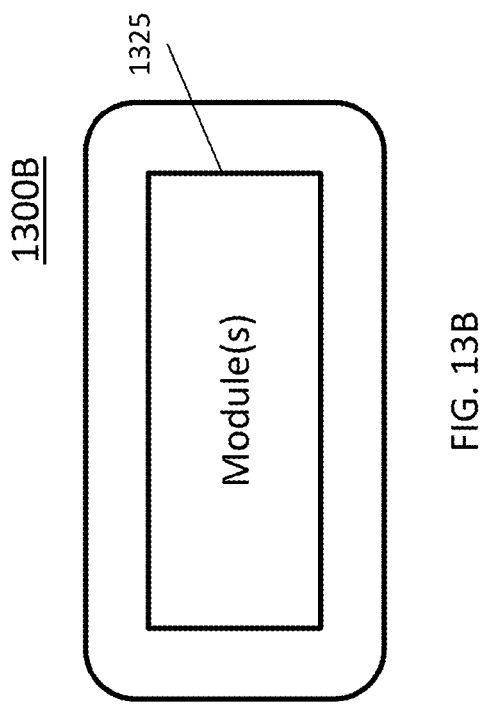
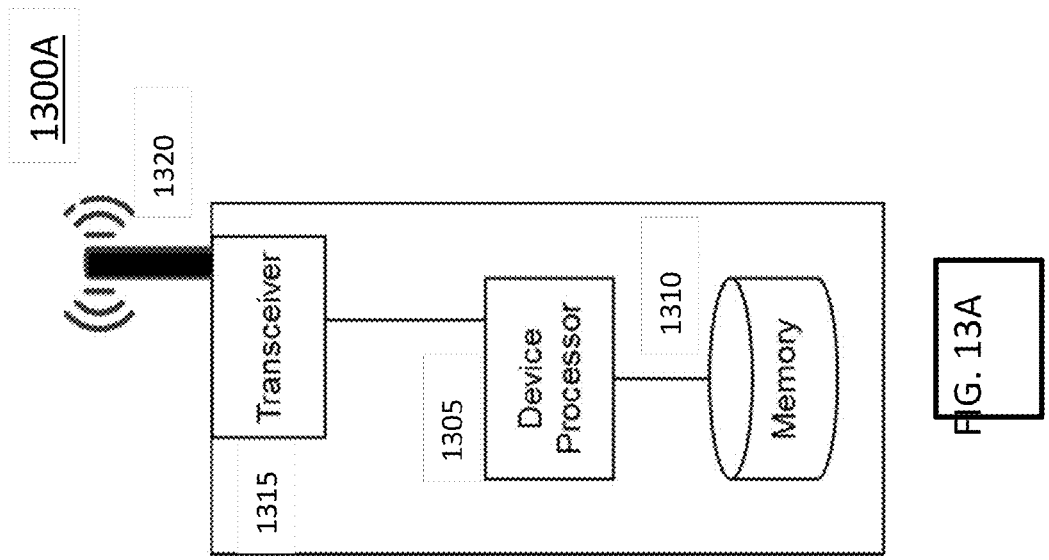
FIG. 13B
FIG. 13A

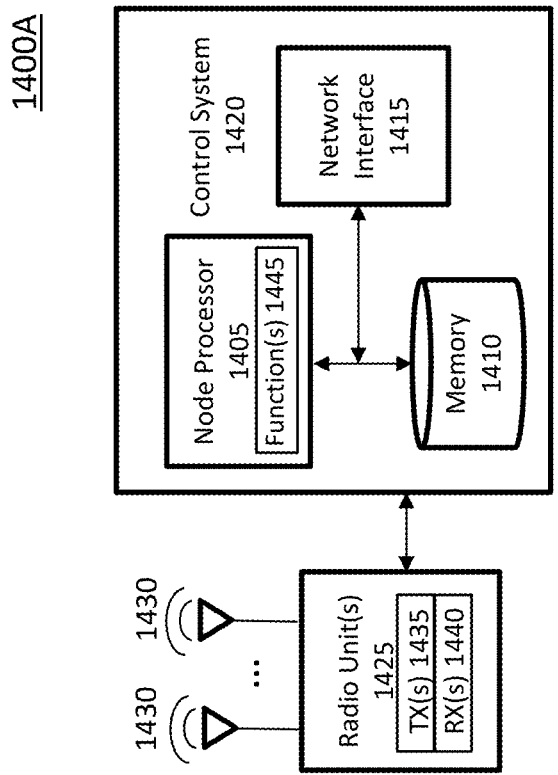
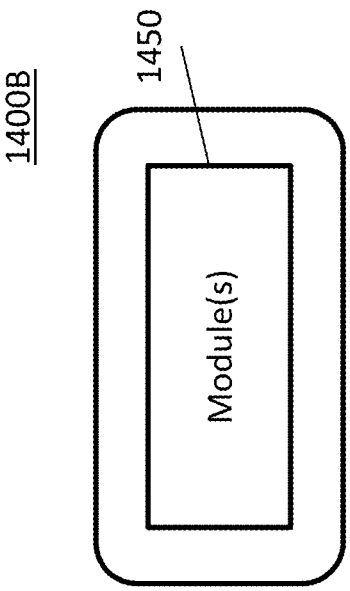
FIG. 14A
FIG. 14B

MULTI-SUBCARRIER SYSTEM WITH MULTIPLE NUMEROLOGIES

CROSS-REFERENCE TO RELATED APPLICATIONS

This application is a continuation application of U.S. patent application Ser. No. 15/446,671, filed Mar. 1, 2017, which claims priority to U.S. Provisional Patent Application No. 62/336,302 filed on May 13, 2016, the respective disclosures of which are hereby incorporated by references in their entirety.

TECHNICAL FIELD

The disclosed subject matter relates generally to telecommunications. Certain embodiments relate more particularly to operation of multi-subcarrier systems using multiple numerologies.

BACKGROUND

One of the cornerstones of fifth generation mobile networks (5G) is to expand services offered by the network beyond mobile broadband (MBB). New use cases may come with new requirements. At the same time, 5G should also support a wide frequency range and be flexible when it comes to deployment options.

SUMMARY

In some embodiments of the disclosed subject matter, a method of operating a user equipment comprises addressing multi-subcarrier system resources using at least one of multiple different numerologies available within a single carrier, wherein the multiple different numerologies comprise a first numerology having resource blocks (RBs) with a first bandwidth and a first subcarrier spacing, $\Delta f1$, and a second numerology having RBs with a second bandwidth and a second subcarrier spacing, $\Delta f2$, which is different from $\Delta f1$, and wherein the first numerology is aligned in the frequency domain relative to a frequency reference, Fref, according to $m*\Delta f1+Fref$ and the second numerology is aligned in the frequency domain relative to the frequency reference, Fref, according to $n*\Delta f2+Fref$, where m and n are integers. The method further comprises transmitting and/or receiving information within the single carrier according to the at least one of the multiple different numerologies. Allocations on the multiple different numerologies are performed in neighboring nodes or on different beams transmitted from the same node.

In certain related embodiments, subcarriers of allocated RBs of the first numerology are separated from subcarriers of allocated RBs of the second numerology by a frequency gap having a size that is a function of $\Delta f1$ or $\Delta f2$.

In certain related embodiments, the first subcarrier spacing, $\Delta f1$, is related to the second subcarrier spacing $\Delta f2$ by an integer scaling factor N such that $\Delta f2=N*\Delta f1$. Values may be defined as e.g. $\Delta f1=15$ kHz and $\Delta f2=60$ kHz.

In certain related embodiments, the single carrier has a bandwidth of approximately 10 MHz or 20 MHz.

In certain related embodiments, the at least one of the multiple different numerologies comprises a plurality of different numerologies.

In certain related embodiments, the method further comprises transmitting or receiving first and second integers B and D indicating a start frequency relative to a frequency reference and width of a first numerology among the multiple different numerologies, wherein the start frequency is defined according to $B*K1*\Delta f$, and the bandwidth of the first numerology is defined according to $D*K1*\Delta f$, wherein K1 denotes a bandwidth of a smallest addressable unit of the first numerology, expressed in units of a smallest subcarrier spacing of numerologies of the single carrier, and wherein of denotes the smallest subcarrier spacing. In some such embodiments, the method further comprises transmitting or receiving third and fourth integers A and C indicating a start frequency relative to a frequency reference and width of a second numerology among the multiple different numerologies, wherein the start frequency of the second numerology is defined according to $A*K2*\Delta f$, and the bandwidth of the second numerology is defined according to $C*K2*\Delta f$, wherein K2 denotes a bandwidth of a smallest addressable unit of the second numerology, expressed in units of the smallest subcarrier spacing of numerologies of the single carrier. In some such embodiments, the first through fourth integers are transmitted or received in downlink control information (DCI).

In certain related embodiments, the method further comprises transmitting or receiving a bitmap indicating a resource allocation of each of the at least one of the multiple different numerologies.

In some embodiments of the disclosed subject matter, a user equipment comprises processing circuitry and memory collectively configured to address multi-subcarrier system resources using at least one of multiple different numerologies available within a single carrier, wherein the multiple different numerologies comprise a first numerology having resource blocks (RBs) with a first bandwidth and a first subcarrier spacing, $\Delta f1$, and a second numerology having RBs with a second bandwidth and a second subcarrier spacing, $\Delta f2$, which is different from $\Delta f1$, and wherein the first numerology is aligned in the frequency domain relative to a frequency reference, Fref, according to $m*\Delta f1+Fref$ and the second numerology is aligned in the frequency domain relative to the frequency reference, Fref, according to $n*\Delta f2+Fref$, where m and n are integers. The user equipment further comprises at least one transmitter and/or receiver configured to transmit and/or receive information within the single carrier according to the at least one of the multiple different numerologies. Allocations on the multiple different numerologies are performed in neighboring nodes or on different beams transmitted from the same node.

In certain related embodiments, subcarriers of allocated RBs of the first numerology are separated from subcarriers of allocated RBs of the second numerology by a frequency gap having a size that is a function of $\Delta f1$ or $\Delta f2$.

In certain related embodiments, the first subcarrier spacing, $\Delta f1$, is related to the second subcarrier spacing $\Delta f2$ by an integer scaling factor N such that $\Delta f2=N*\Delta f1$. In some such embodiments, $\Delta f1=15$ kHz and $\Delta f2=60$ kHz.

In certain related embodiments, the single carrier has a bandwidth of approximately 10 MHz or 20 MHz.

In certain related embodiments, the at least one of the multiple different numerologies comprises a plurality of different numerologies.

In certain related embodiments, the at least one transmitter and/or receiver is further configured to transmit and/or receive first and second integers B and D indicating a start frequency relative to a frequency reference and width of a first numerology among the multiple different numerologies, wherein the start frequency is defined according to $B*K1*\Delta f$, and the bandwidth of the first numerology is defined according to $D*K1*\Delta f$, wherein K1 denotes a bandwidth of a smallest addressable unit of the first numerology, expressed in units of a smallest subcarrier spacing of numerologies of the single carrier, and wherein of denotes the smallest subcarrier spacing. In some such embodiments, the at least one transmitter and/or receiver is further configured to transmit and/or receive third and fourth integers A and C indicating a start frequency relative to a frequency reference and width of a second numerology among the multiple different numerologies, wherein the start frequency of the second numerology is defined according to A*K2*Δf, and the bandwidth of the second numerology is defined according to C*K2*Δf, wherein K2 denotes a bandwidth of a smallest addressable unit of the second numerology, expressed in units of the smallest subcarrier spacing of numerologies of the single carrier. Moreover, in some such embodiments the first through fourth integers are transmitted or received in downlink control information (DCI). The at least one transmitter and/or receiver may be further configured to transmit or receive a bitmap indicating a resource allocation of each of the at least one of the multiple different numerologies.

BRIEF DESCRIPTION OF THE DRAWINGS

The drawings illustrate selected embodiments of the disclosed subject matter. In the drawings, like reference labels denote like features.

FIG. 13A illustrates a wireless communication device according to an embodiment of the disclosed subject matter.

FIG. 13B illustrates a wireless communication device according to another embodiment of the disclosed subject matter.

FIG. 14A illustrates a radio access node according to an embodiment of the disclosed subject matter.

FIG. 14B illustrates a radio access node according to another embodiment of the disclosed subject matter.

DETAILED DESCRIPTION

Figure 1:
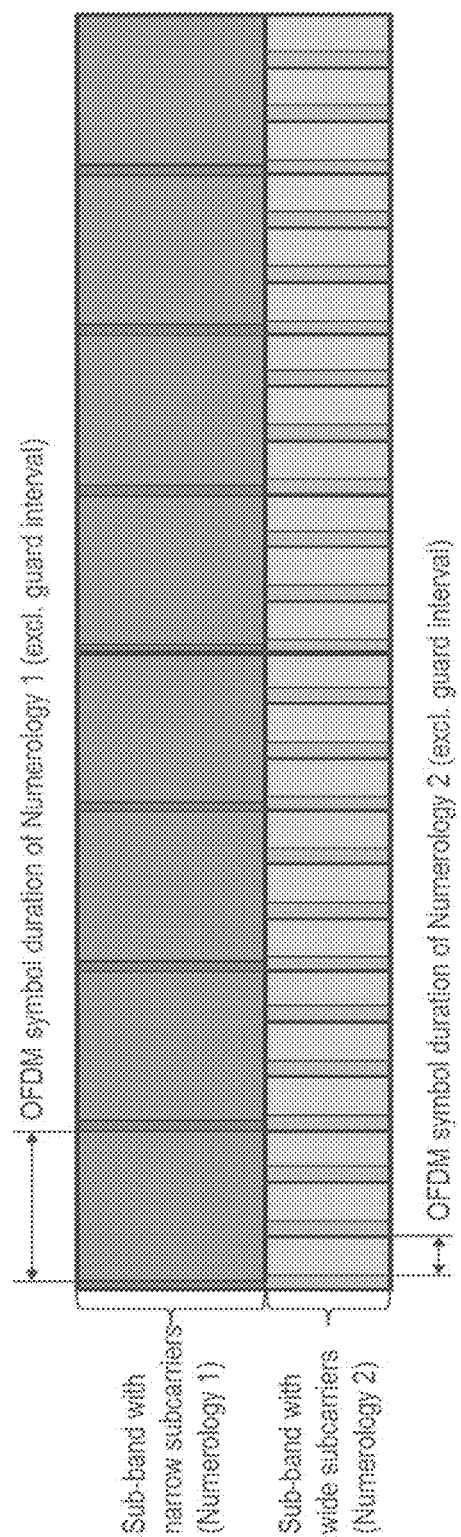
FIG. 1 illustrates two signals with different numerologies separated in frequency according to an embodiment of the disclosed subject matter.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

In some embodiments, the physical resources of a carrier are allocated and/or addressed using multiple numerologies each corresponding to subcarriers located at positions that are defined with respect to a common frequency reference. In this context, the term "numerology" refers generally to the configuration of physical resources in a multi-subcarrier system, such as an OFDM system. Such a configuration may include, e.g., sub-carrier spacing, symbol duration, cyclic prefix, resource block size, etc. As an example, the physical resources of a 10 MHz or 20 MHz carrier may be addressed and/or allocated using a first numerology having 15 kHz subcarrier spacing and a second numerology having 60 kHz subcarrier spacing, with the subcarriers for each of the two numerologies being located at positions that are defined with respect to the same frequency reference. In certain related embodiments, signaling is provided for configuring and/or communicating the addressing and/or allocation between different devices.

In the description that follows, the frequency reference, which is common for all numerologies, will be denoted by "Fref". The frequency reference Fref may be derived from (related to) e.g. EARFCN/UARFCN/NX-ARFCN frequency raster and may be retrieved by a node using a synchronization signal (such as PSS/SSS in LTE, or SSI, MRS, BRS in NX).

In certain embodiments, the frequency alignment of numerologies is staggered so that Resource Blocks (RBs) of a first numerology start at (e.g. possibly defined at the center of the first subcarrier of the RB) y*N1*Δf1+Fref, and RBs of a second numerology start at z*N2*Δf2+Fref, where "y" and "z" are integers and Δf1 and Δf2 are the respective subcarrier spacings of the first and second numerologies.

In certain embodiments, RB sizes are selected so that N2=N1, or more generally so that (N2*X)/N1 is an integer if Δf2 is related to Δf1 as Δf2=XΔf1. Also signaling of allocation information should map to a set of RBs in the numerology to which the allocation information refers.

In certain embodiments, the RB bandwidth of the second numerology is X*N1*Δf1. Or, put differently, the bandwidth of an RB in the second numerology is equal to X times the bandwidth of an RB in the first numerology.

When addressing an allocation, signaling may use a coarser grid than the RB grid, and embodiments are presented herein to allow for control of guard bands between numerologies with the granularity of the RB grid of the numerology with the smallest Δf.

Certain embodiments allow for aligned subcarrier positions—and subcarriers of all numerologies end up on their natural grid related to the same frequency reference. This may simplify implementation and signaling.

Allocations on different numerologies in neighboring nodes (or on different beams transmitted from the same node) may be aligned in frequency. This creates a predictable interference pattern and also enables interference cancellation techniques. Furthermore, it allows adjacent allocations in different cells without guard bands.

Because each RB is aligned on its natural grid, RBs of the same numerology may be aligned across cells. This enables orthogonal reference signals across cells.

Certain embodiments also allow for creating guard bands between numerologies on the same carrier without explicit signaling other than the normal addressing of allocation. This allows mix of numerologies to be transparent to terminals on the same carrier (in case a given terminal is scheduled on only one numerology). It also allows for guard band sizes that can be adapted to a particular scenario. Less guard band may for example be needed in a scenario with low signal-to-noise ratio (SNR) compared to a scenario when SNR is high.

The described embodiments have been developed in consideration of various observations made by the inventors, including the following.

Some services require shorter transmission time interval (TTI), compared to LTE, in order to reduce latency. In an OFDM system, shorter TTIs may be realized by changing subcarrier spacing. Other services may need to operate under relaxed synchronization requirements or support very high robustness to delay spread, and this may be accomplished by extending the cyclic prefix in a system operating with cyclic prefix (such as envisioned for NX). These are just examples of possible requirements.

Selecting parameters such as subcarrier spacing and cyclic prefix lengths is a tradeoff between conflicting goals. This points to a need for 5G radio access technologies (RATs) to support several variants of transmission parameters, commonly called numerologies. Such transmission parameters might be symbol duration (which directly relates to subcarrier spacing in an OFDM system), or guard interval or cyclic prefix duration.

It furthermore is beneficial to be able to support several services on the same frequency band—the multiple numerologies may or may not be operated on the same node. This allows for dynamic allocation of resources (bandwidth for example) between the different services, and for efficient implementation and deployment. Hence, in some cases, there is a need for using more than one numerology simultaneously on the same band (we use the term "band" to denote a carrier or a set of carriers served by the network).

An MBB terminal may for example be served with a subcarrier spacing of 15 kHz. A typical cyclic prefix is less than 5 μs and constitutes an overhead of less than 10%. Another device, e.g. a machine-type-communication (MTC) device that requires very low latency, might be served with a subcarrier spacing of or 60 kHz (or 75 kHz). To match the same deployment as the MBB terminal, a similar long guard interval is needed. A guard interval can be cyclic prefix, a known word, or a true guard interval comprising zero-valued samples. In the following we use the term guard interval to refer to any of them.

The duration of an OFDM symbol is the inverse of the subcarrier spacing, i.e. $1/\Delta f$, i.e. an OFDM symbol with wide subcarriers is shorter than an OFDM symbol with narrow subcarriers. For example, the symbol duration of an OFDM symbol with $\Delta f1=15$ kHz is $1/\Delta f1=67$ μs and with $\Delta f2=60$ kHz the symbol duration is $1/\Delta f2=17$ μs. A guard interval of 4.7 μs constitutes an overhead of 5% and 22% for OFDM symbols with $\Delta f1=15$ kHz and $\Delta f2=60$ kHz wide subcarriers, respectively. The amount of resources (subcarriers) set aside for the MTC service should therefore be adapted to the amount needed due to the large overhead.

Another use case could be mixing of $\Delta f2=15$ kHz and $\Delta f1=3.75$ kHz (i.e. a more narrowband numerology) for another kind of MTC service. While the cyclic prefix overhead of this numerology is lower than for $\Delta f2=15$ kHz, the subcarrier bandwidth is very narrow and supports only slowly moving terminals due to Doppler robustness. Therefore, the amount of resources (subcarriers) set aside with $\Delta f1=3.75$ kHz should be adapted again to the required needs. A reasonable assumption for NX/NR is that the supported numerologies are related to each other by integer scaling factors: $\Delta f2=X\Delta f1$ with $\Delta f2$ and $\Delta f1$ the wide and narrow subcarrier spacing, respectively.

The different numerologies (e.g. OFDM subcarrier bandwidths) are not orthogonal to each other, i.e. a subcarrier with subcarrier bandwidth $\Delta f1$ interferes with a subcarrier of bandwidth $\Delta f2$ or two OFDM numerologies with same subcarrier spacing but different cyclic prefixes (CPs) are also interfering with each other. In Filtered or windowed OFDM, signal processing is introduced to suppress interference between different numerologies. Typically, a guard band also needs to be inserted between numerologies.

In any communication system, resources need to be addressed, or indexed. A typical example is when scheduling a transmission in downlink and signaling which resources to be used on a control channel, or when signaling an uplink grant, etc. In general, addressing or indexing occurs when a set of resources is identified according to an addressing scheme, such as a scheme defined by or constrained by a first and/or second numerology as discussed above.

A fundamental smallest unit in the frequency domain may be a single subcarrier. There are several reasons for having a larger smallest addressable unit (or alternatively expressed, a larger granularity in resource assignments, or resource grid), these include:

signaling overhead—the number of bits needed to address a resource grows when the smallest addressable unit size decreases, and processing aspects—the processing performance may be improved when parameters may be assumed constant over a larger interval—a typical example is interference (inter-cell or intra-cell), and also implementation aspects.

Having a too large smallest addressable unit limits flexibility in a system. For example, the smallest allowed allocation must not become too large.

In LTE, the smallest addressable unit in frequency-domain is typically a single physical resource block (PRB), which is 12 subcarriers wide. In some cases, granularity is even larger (a resource block group is up to 48 subcarriers when allocations are signaled using a bitmap).

For simplicity, this description uses the label "RB" to denote the smallest addressable unit; it uses the label "N1" to denote the number of subcarriers per RB for numerology 1; and it uses the label "N2" to denote the number of subcarriers per RB for numerology 2. The use of these labels does not necessarily limit the smallest addressable unit to a resource block, nor does it limit the number of numerologies to two.

From the reasoning above it is apparent that selecting the RB size, or, alternatively, the granularity of the resource grid, is a trade-off and that the same smallest addressable unit in terms of absolute frequency may be different for different numerologies. At the same time the smallest addressable units of the numerologies that are mixed on a carrier should allow for creating the necessary guard band as discussed above. It is also desirable to have resource allocation schemes of different numerologies match, in order to cater for the signal processing aspects described above, and to be able to share resources efficiently.

If the smallest addressable unit in absolute frequency is not properly selected for all numerologies operating on a carrier, then some numerologies (with larger subcarrier spacing $\Delta f$) may be allocated with an offset relative to its natural subcarrier grid (on which subcarriers are modulated on integer multiples of the subcarrier spacing relative to a frequency reference). This is not desirable from an implementation point of view.

If the resource grids are not properly aligned between numerologies, interference levels may fluctuate more than necessary across an allocation. As an example, it may not be possible for allocations in two neighboring cells to occupy adjacent, non-overlapping resources without creating a guard interval. And in the case overlap is in fact desired it may not be perfect—leading to fluctuating interference environment across an allocation.

Furthermore, if resource addressing is not properly designed, taking multiple numerologies into account, it may not be possible to allocate proper guard bands between numerologies in a mixed numerology system—they may need to be overly large which will lead to resource waste. Still further, the multiple numerologies should relate to a common frequency reference.

In light of the above and other considerations, the following concepts (1)-(4) are presented for subcarrier and RB grids of numerologies operating on the same carrier. It will be assumed, without loss of generality, that the subcarrier spacings $\Delta f2$ and $\Delta f1$ are related by $\Delta f2 >= \Delta f1$. It will also be assumed that only two numerologies are used, but the described concepts could be readily applied to any number of numerologies.

Figure 2:
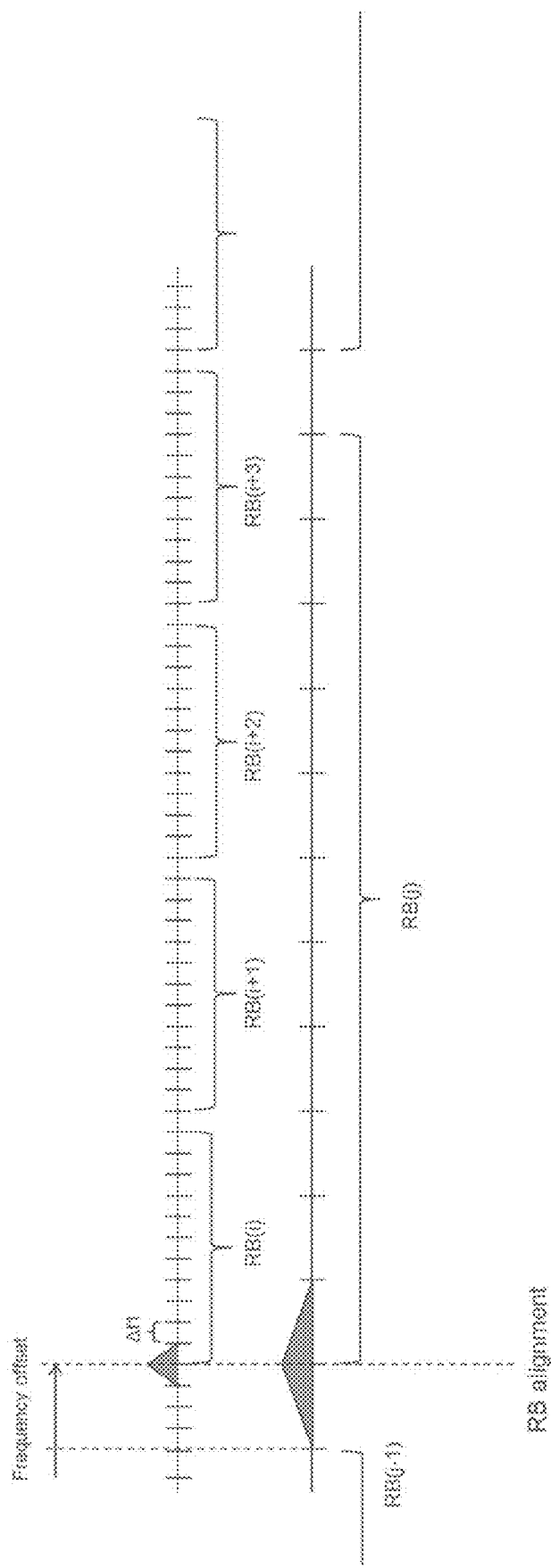
FIG. 2 illustrates resource block (RB) alignment and frequency offset (staggering) being different for different numerologies according to an embodiment of the disclosed subject matter.

(1) In a system applying mixed numerology, a frequency gap is inserted between numerology 1 and numerology 2 so that subcarriers of numerology 2 are on its natural subcarrier grid (n*$\Delta f2$+Fref, n any integer). Numerology 1 subcarriers are on its natural subcarrier grid (n*$\Delta f1$+Fref). This is illustrated in FIG. 2. In FIG. 2, shaded triangles illustrate the main lobes of subcarriers in the two numerologies. Notably, the drawing in FIG. 2 is schematic, and in practice subcarriers are slowly decaying sinc functions with infinite support.

(2) Concept (1), and additionally RBs of numerology 2 start at the grid where numerology 1 RBs start. Start of an RB could be defined via its first subcarrier as an example; this example is illustrated in FIG. 2.

(3) Concept (2) above, and additionally RB grid of numerology 1 is y*N1*$\Delta f1$+Fref. (N1 is RB size of numerology 1, y integer)

(4) Concept (1) above, and additionally RB of numerology 2 start at natural grid of numerology 2, i.e. z*N2*$\Delta f2$+Fref. (N2 is RB size of numerology 2, z integer)

If $\Delta f2$ is related to $\Delta f1$ as $\Delta f2 = X\Delta f1$, X integer, then concepts (2), (3), (4) provide that for any z integer, there is an integer y such that $$y*N1*\Delta f1 = z*N2*\Delta f2 = z*N2*X\Delta f1 -> y*N1 = z*N2*X.$$

This provides that (N2*X)/N1 should be an integer. For N2=N1 this is always fulfilled.

In the following description, "K2" will denote the bandwidth of an RB of numerology 2 expressed in the smallest subcarrier spacing of the numerologies applicable for the carrier. If N2=N1, then K2=X*N1. Similarly, "K1" will denote the bandwidth of an RB of numerology 1 expressed in the smallest subcarrier spacing of the numerologies applicable for the carrier.

The subcarrier spacing $\Delta f$ will denote the narrowest subcarrier spacing defined for a carrier. For instance, if a carrier employs a first numerology with subcarrier spacing $\Delta f1 = 15$ kHz and a second numerology with subcarrier spacing $\Delta f2 = 60$ kHz, then the narrowest subcarrier spacing $\Delta f$ will be 15 kHz.

Figure 3:
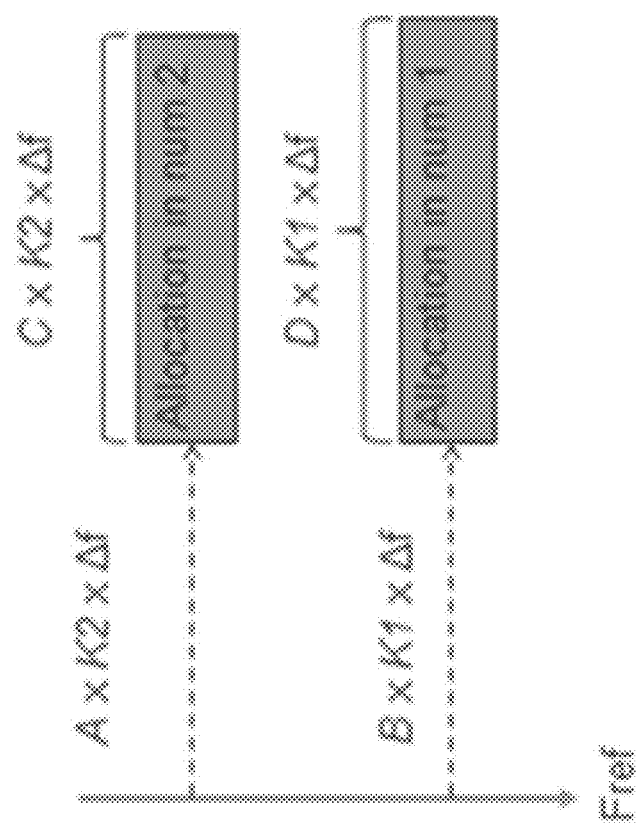
FIG. 3 illustrates how an allocation start and bandwidth may be determined for two different numerologies defined in relation to a common frequency reference, based on integers A and C, and B and D, respectively, according to an embodiment of the disclosed subject matter.

The respective values for $\Delta f$, K1 and K2 can be used by a device (e.g., a wireless communication device or radio access node) to determine the respective start and bandwidth for different numerologies, as illustrated by FIG. 3.

Figure 4:
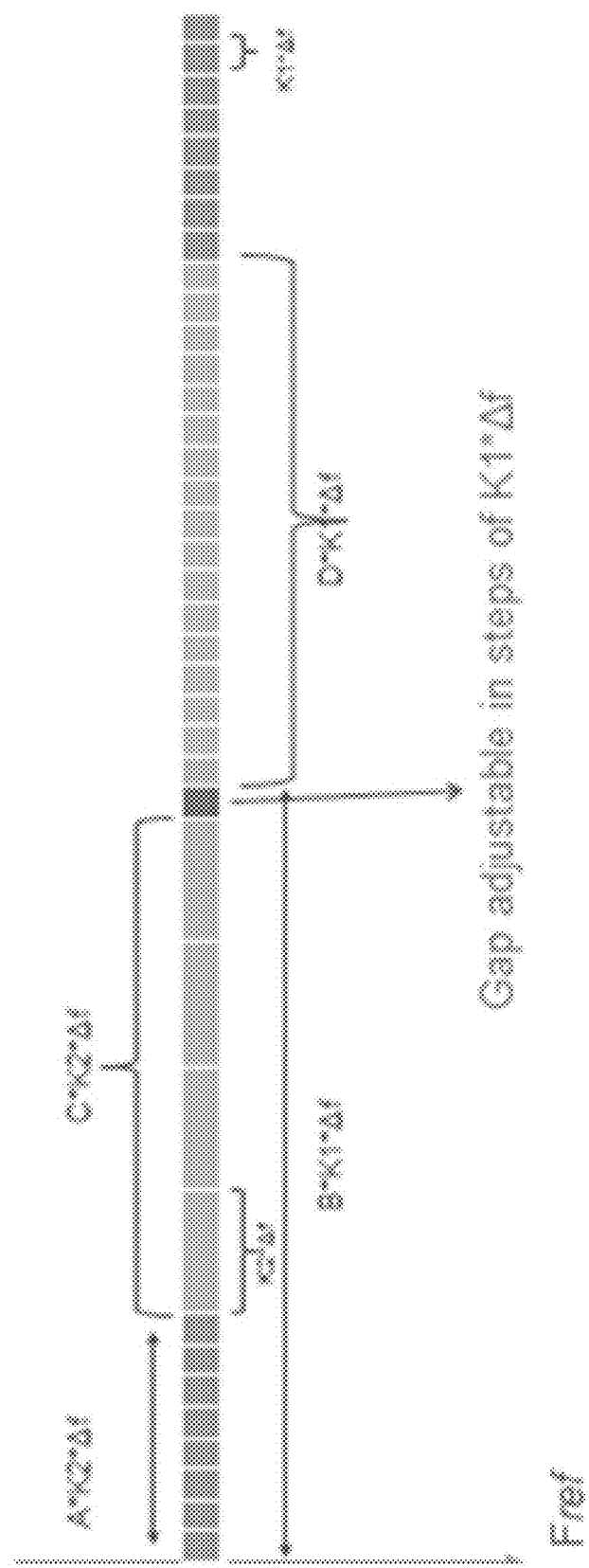
FIG. 4 illustrates how RBs may be allocated to create a guard band between two numerologies on the same carrier according to an embodiment of the disclosed subject matter.
Figure 5:
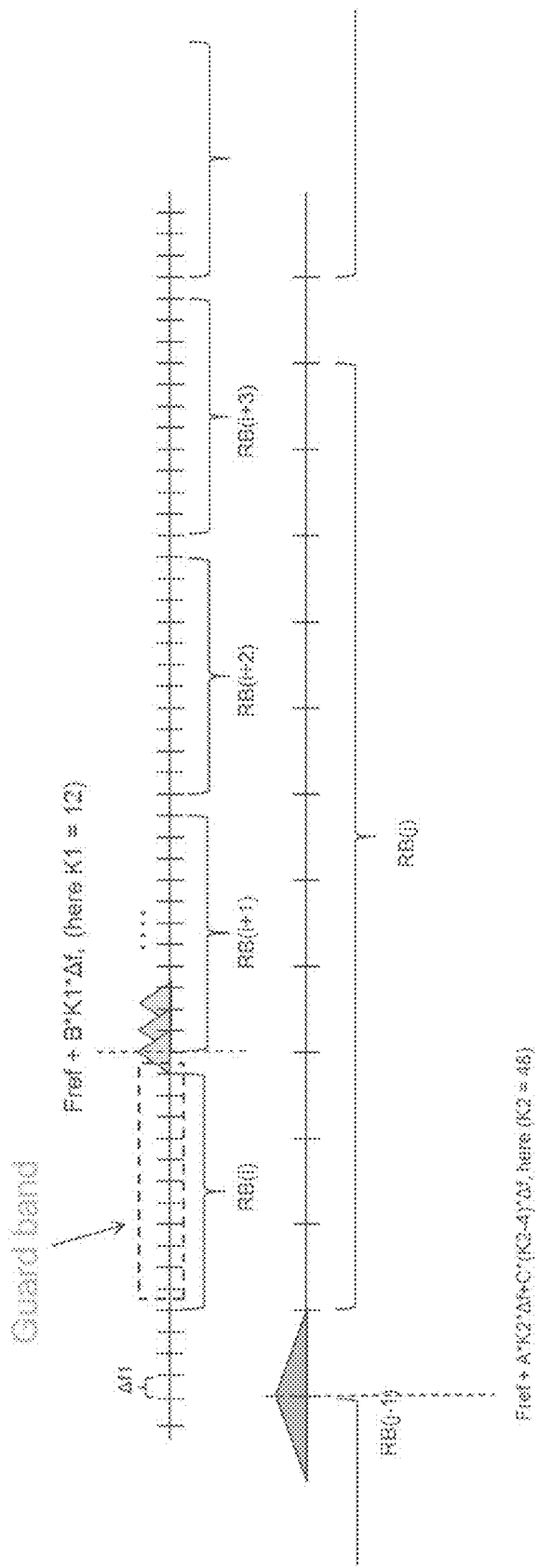
FIG. 5 illustrates an example of the guard band of FIG. 4 in further detail according to an embodiment of the disclosed subject matter.

FIG. 3 illustrates how an allocation start and width may be determined for two different numerologies defined in relation to a common frequency reference, based on based on integers A and C, and B and D, respectively, according to an embodiment of the disclosed subject matter. FIG. 4 illustrates how RBs may be allocated to create a guard band between two numerologies on the same carrier according to an embodiment of the disclosed subject matter.

Referring to FIG. 3, the integers may be signaled from one or more devices to one or more other devices (e.g., from an eNB to one or more UEs). The signaling allows the receiving devices to determine the respective start frequencies and widths of their numerology/ies with relatively low overhead. Note that in the example of FIG. 3, two data blocks corresponding to two different numerologies may be allocated to two different users.

In the example of FIG. 3, a start frequency for a first numerology is defined relative to Fref as Fref+B*K1*$\Delta f$, and a width of the first numerology is defined as D*K1*$\Delta f$. Similarly, a start frequency for a second numerology is defined relative to Fref as Fref+A*K2*$\Delta f$, and a width of the first numerology is defined as C*K2*$\Delta f$.

In some embodiments, A and C are signaled in downlink control information (DCI) and B and D are also signaled in DCI, where the DCI carrying A and C may be the same or different from the DCI carrying B and D.

In some embodiments, K1 and K2 may be preconfigured values, e.g., defined by a product or standard specification. In some other embodiments, K1 and K2 may be semi-statically configured. In the drawings we denote by $\Delta f$ the narrowest subcarrier spacing defined for the carrier. This could be fixed (defined in the specification) or configured dynamically.

As an alternative to the examples shown in FIGS. 3 and 4, in some situations a bitmap may be signaled instead of the integers. In the bitmap, each bit represents a part of a carrier (group of M RBs in the corresponding numerology the bitmap is for), and the value of the bit indicates whether that part of the band is allocated or not. Having a single bit to indicate a large group of RBs reduces the signaling load (fewer bits needed to convey). As yet another alternative to the examples shown in FIGS. 3 and 4, a UE may store a table (or other applicable data structure) with defined numerologies, and then the UE may receive an index for the table UE, which will inform the UE of relevant information for the defined numerologies.

Figure 6:
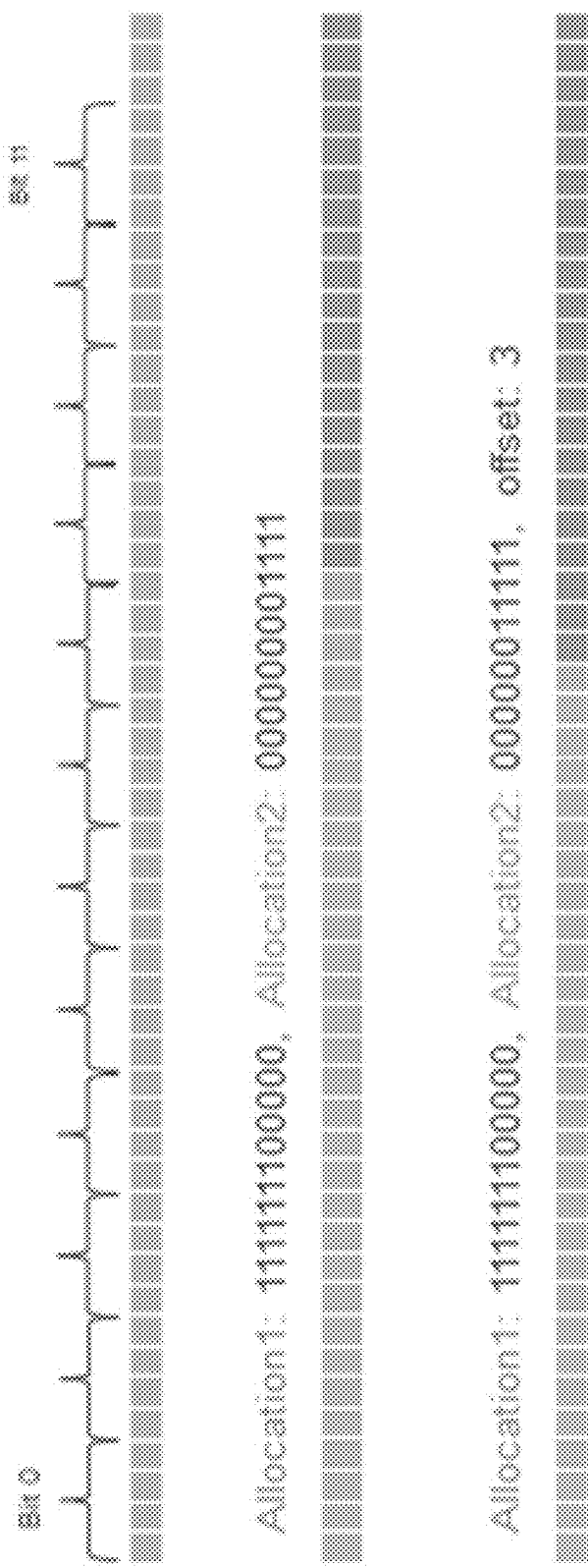
FIG. 6 illustrates another example of the guard band of FIG. 4 in further detail according to an embodiment of the disclosed subject matter.

In a system with multiple numerologies according to certain embodiments, a bit would indicate one or multiple RBs, defined by the RB grid of the numerology. A guard band can be inserted by appropriately setting the bit maps of the allocations (as illustrated in FIG. 6, top example). From the example it may be noted that the smallest guard band possible is the same as the size of the group of RB indicated by single bit. This may lead to overly large guard bands.

Here we propose to signal an offset (with values 0 to M-1) together with the bitmap (the number of bits needed for this is log 2 (M)). The offset changes the starting RB of the group of RBs indicated by each bit. This allows for controlling the guard band on a granularity of the RB size of numerology with smallest subcarrier spacing. The idea is illustrated in FIG. 6 (bottom allocation example). Note that with this way of representing an allocation, the RB grid as discussed above is still adhered to.

The following is a further description of certain concepts presented above, together with a description of other possible features of mixed numerology systems.

In an OFDM system supporting mixed numerologies different OFDM numerologies are multiplexed in frequency-domain on the same carrier. This benefits simultaneous support of services with vastly different requirements, e.g. ultra-low latency communications (short symbols and thus wide subcarrier spacing) and MBMS services (long symbols to enable long cyclic prefix and thus narrow subcarrier spacing).

Figure 7:
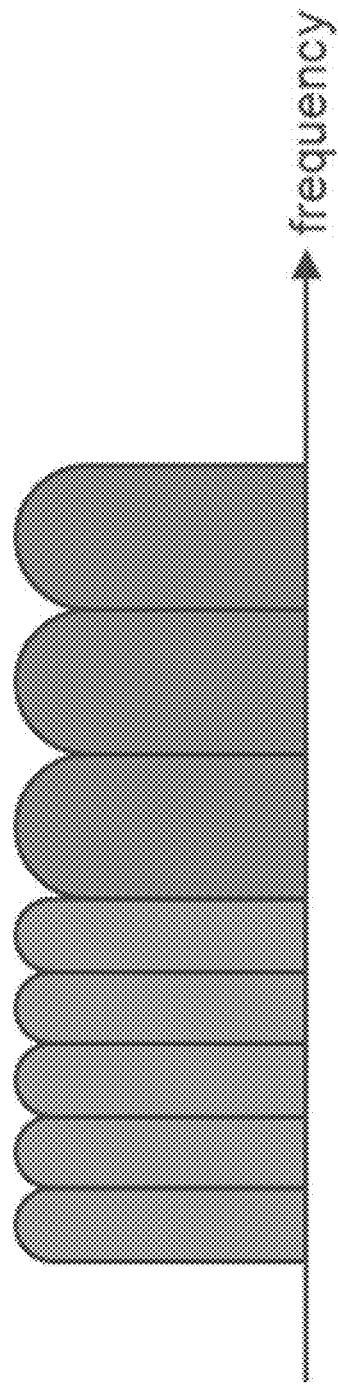
FIG. 7 illustrates frequency-domain multiplexing of different numerologies according to an embodiment of the disclosed subject matter.

In a conventional OFDM system all subcarriers are orthogonal to each other. Subcarrier transfer functions are not "brick wall" pulses but have sinc-like behavior; orthogonality between subcarriers is achieved via properties of the waveform and not via energy-confinement to a subcarrier bandwidth (sinc-like since in discrete-time signal processing a rectangular pulse is not exactly a sinc-function). In an OFDM system with different numerologies (subcarrier bandwidth and/or cyclic prefix length) multiplexed in frequency-domain, see FIG. 7, only subcarriers within a numerology are orthogonal to each other. Subcarriers from one numerology interfere with subcarriers from another numerology since energy leaks outside the subcarrier bandwidth and is picked up by subcarrier filters of the other numerology.

To reduce inter-numerology interference, the transmit spectrum of each numerology must be better confined, i.e. a better spectrum roll-off is needed.

Figure 8:
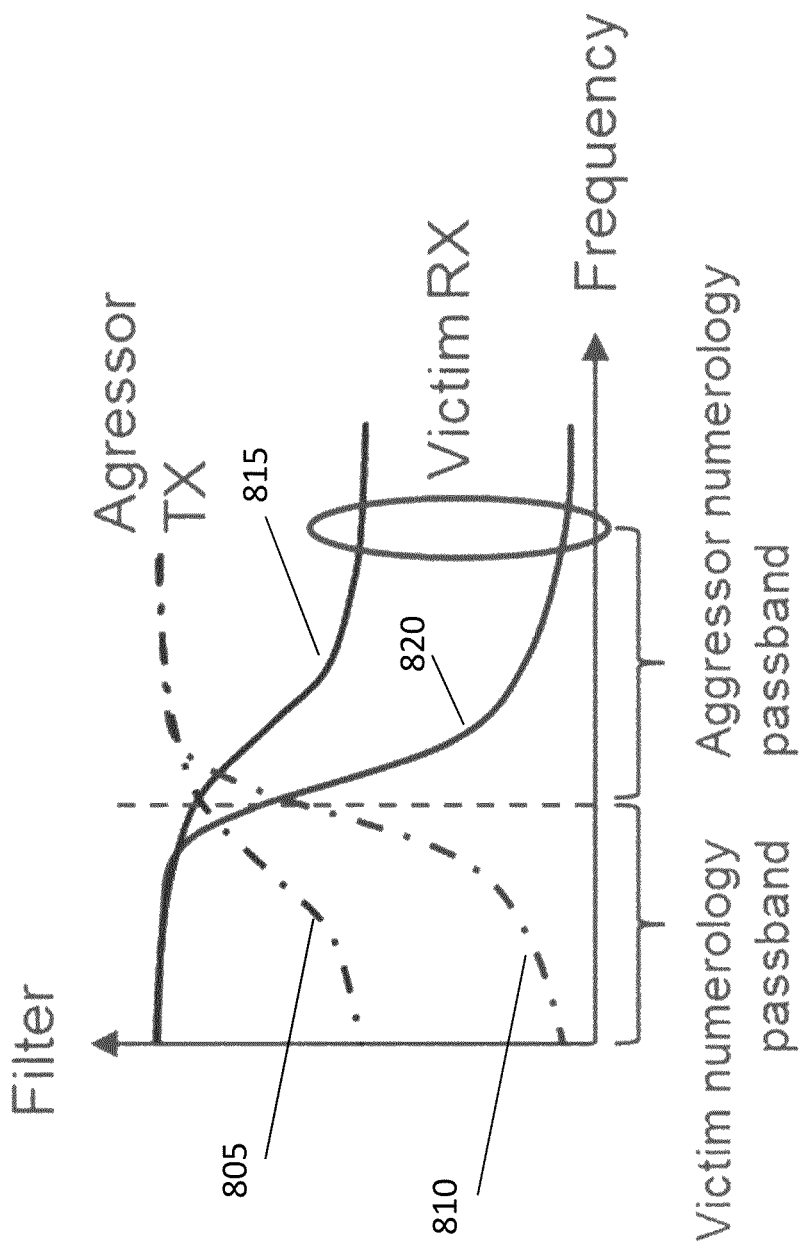
FIG. 8 shows two sub-bands with different numerologies according to an embodiment of the disclosed subject matter.

FIG. 8 shows two sub-bands with different numerologies. An aggressor numerology (dash-dotted lines) must apply a spectrum emission confinement technique to reduce energy transmitted in the passband of the victim numerology (810). However, emission control alone is not sufficient since a victim receiver without steeper roll off (815) picks up high interference from the passband of the aggressor numerology. Only if the victim receiver (820) and the aggressor transmitter (810) have improved filter functions inter-numerology interference is efficiently reduced.

Windowing and filtering are techniques to improve transmitter and receiver characteristics with respect to spectral confinement.

Guard tones can be inserted between numerologies to reduce inter-numerology interference and/or relax the required degree of required spectrum confinement. Adding guard tones slightly increases overhead; in a 20 MHz system with 1200 subcarriers one guard tone corresponds to less than 0.1% overhead. Trying to minimize guard tones to an absolute minimum may therefore not be worth the effort (since it increases requirements on spectrum confinement technique both at transmitter and receiver), and it also complicates other system design aspects as outlined below.

Figure 9:
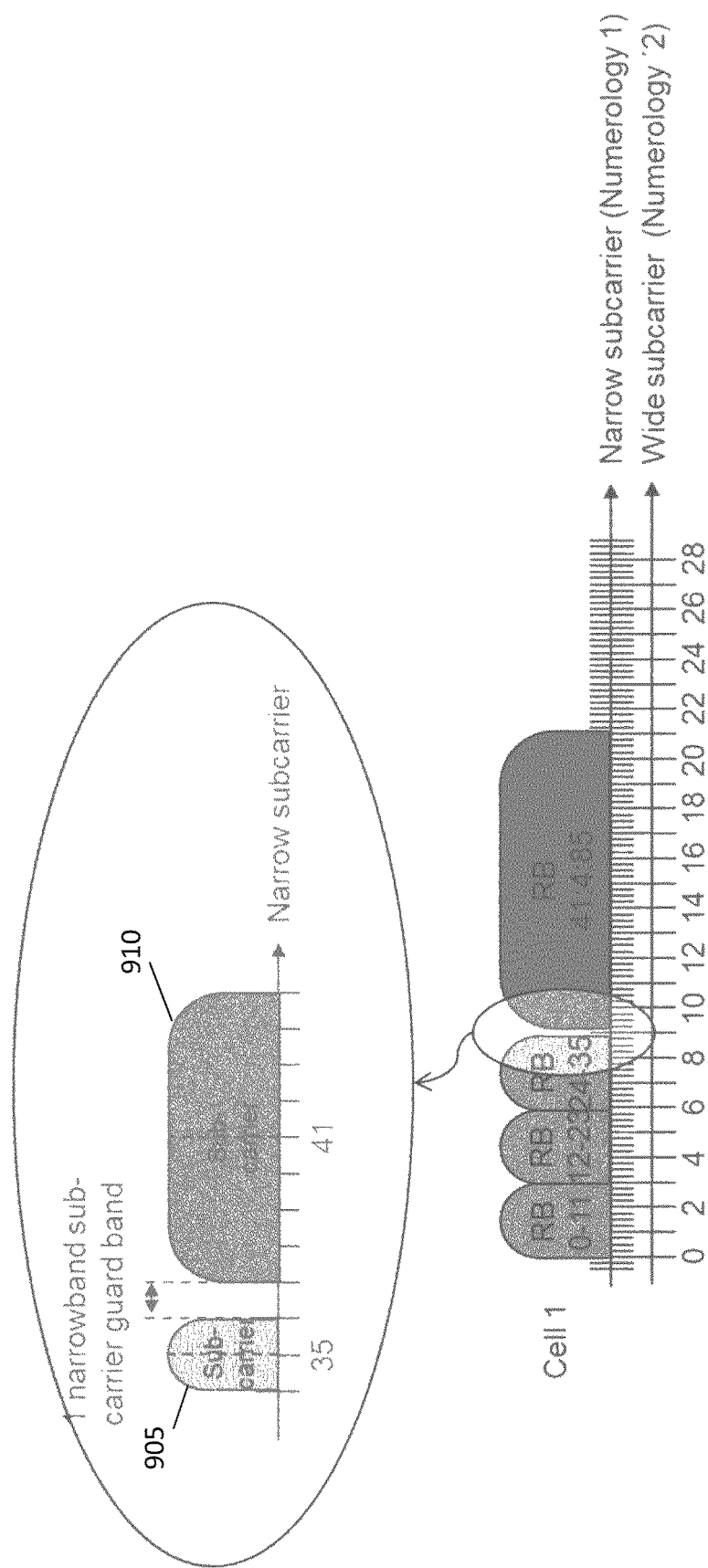
FIG. 9 illustrates a narrowband subcarrier inserted as guard between first and second numerologies 1 and 2 according to an embodiment of the disclosed subject matter.

FIG. 9 illustrates a narrowband subcarrier inserted as a guard interval between first and second numerologies 1 and 2 according to an embodiment of the disclosed subject matter. The first subcarrier of numerology 2 is located at 41×15"kHz" which corresponds to subcarrier 10.25 in 60 kHz subcarrier grid.

Referring to FIG. 9, one narrowband subcarrier is inserted as a guard between numerology 1 (905, e.g. 15 kHz) and numerology 2 (910, 4 times as wide subcarriers, e.g. 60 kHz). A resource block is 12 (narrowband or wideband) subcarriers for both numerologies. If the scheduling is done as indicated for numerology 2 then subcarriers of numerology 2 are not even on the 60 kHz resource grid (the first subcarrier of an RB in 910 is on narrow subcarrier 41 which corresponds to wide subcarrier 10.25, so a fractional subcarrier shift).

To avoid fractional subcarrier shifts subcarrier frequencies in each numerology should coincide with the natural grid of the numerology n×Δf, with Δf the subcarrier spacing of the numerology. However, even with this requirement wide resource blocks (numerology 2) are still not on its natural grid if compared to cell 2.

Figure 10:
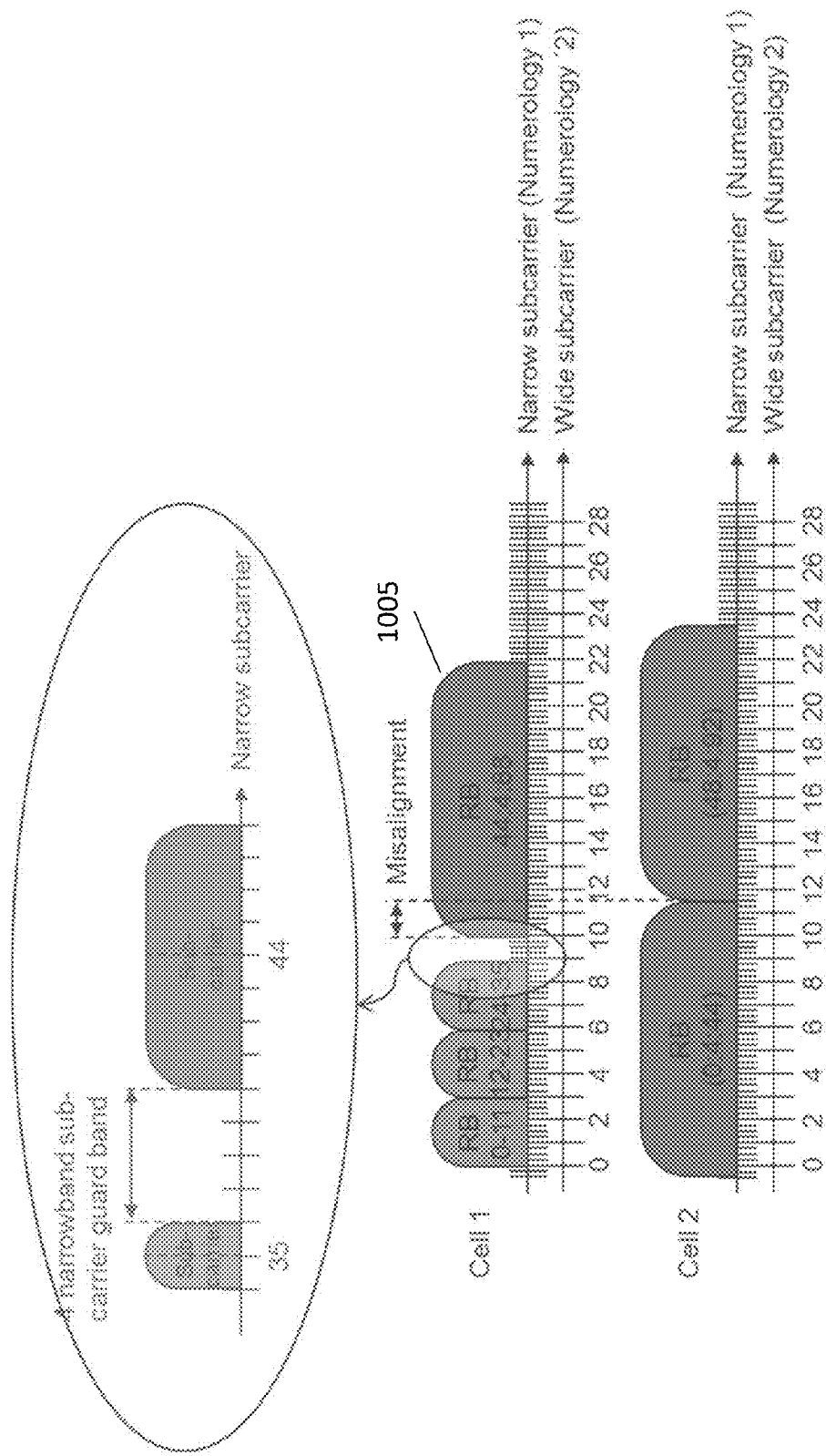
FIG. 10 illustrates four narrowband subcarriers inserted as guard between numerology 1 and 2 according to an embodiment of the disclosed subject matter.

FIG. 10, for instance, illustrates four narrowband subcarriers inserted as guard between numerology 1 and 2 according to an embodiment of the disclosed subject matter. Subcarriers of numerology 2 are now located on its natural resource grid. However, numerology 2 resource blocks are still misaligned across cells.

Such a misaligned resource grid implies that all users of numerology 2 would have to be dynamically informed about this offset (since this offset depends on the scheduling decision). In another cell a different offset may be present, or, as shown in FIG. 10, another cell may only operate with numerology 2. Resource blocks in different cells would not be aligned making inter-cell-interference-coordination (ICIC), creation of orthogonal reference signals across cells, and interference prediction across cells more difficult.

Alternatively, a resource block 1005 in cell 1 in FIG. 10 could be a fractional resource block (corresponding to the bandwidth marked by "Misalignment"). Special definitions of reference signals and rate matching would be required for all possible fractional resource blocks. For the fractional resource block in cell 1 and the overlapping resource block in cell 2 the same disadvantages as mention above are valid.

Figure 11:
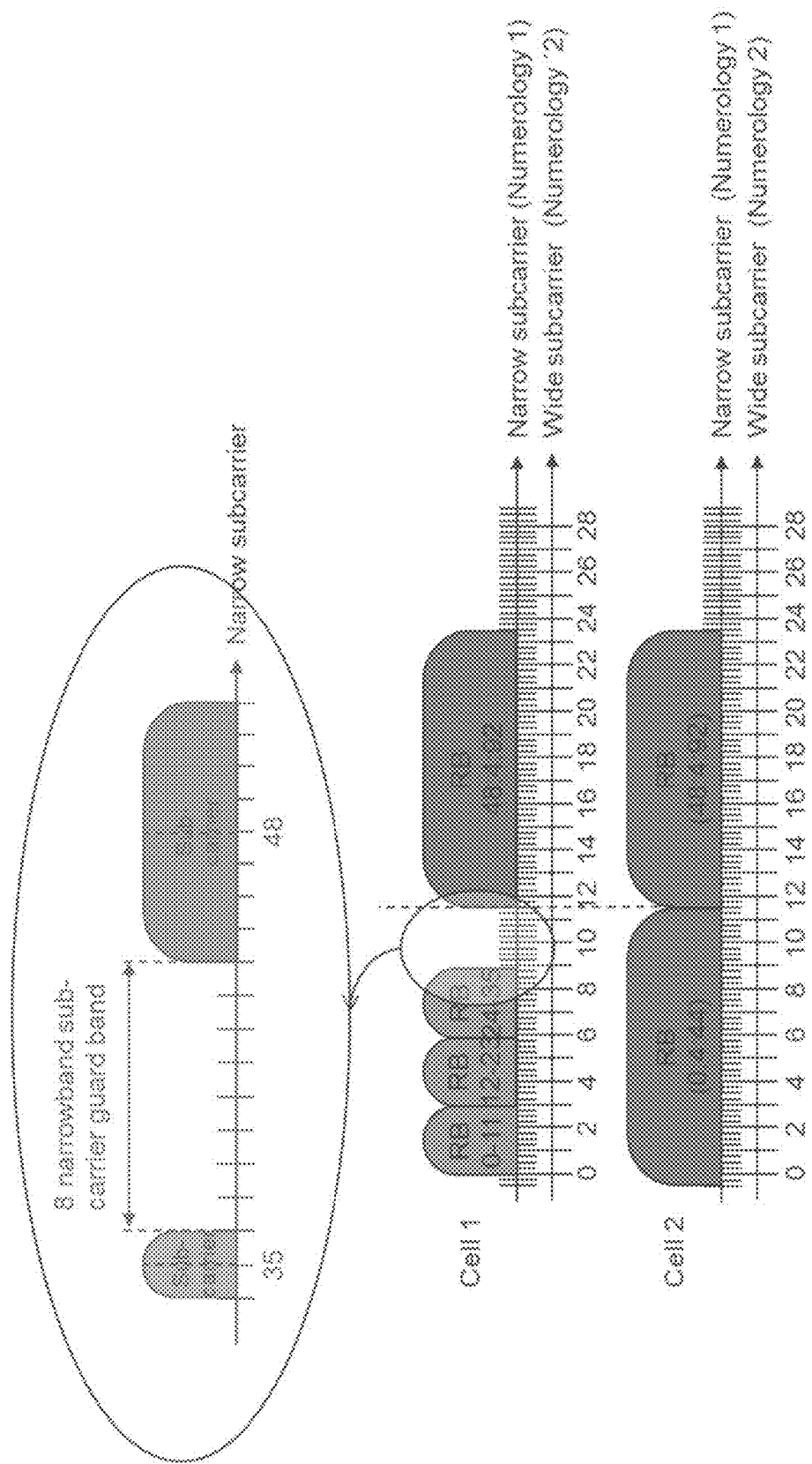
FIG. 11 illustrates eight narrowband subcarriers inserted as guard between numerology 1 and 2 according to an embodiment of the disclosed subject matter.

FIG. 11 illustrates eight narrowband subcarriers inserted as a guard interval between numerology 1 and 2 according to an embodiment of the disclosed subject matter. Subcarriers of numerology 2 are located at its natural resource grid and numerology 2 resource blocks are aligned across cells. In the example of FIG. 11 numerology 1 (15 kHz) resource blocks would always start at frequency n×12×15 kHz and numerology 2 resource blocks (60 kHz) at frequency n×12× 60 kHz (it is assumed that a resource block is 12 subcarriers) relative to reference frequency. This simplifies ICIC, makes interference predication across cells easier, and enables orthogonal reference signals of the same numerology across cells.

For the 15/60 kHz numerology combination, the resulting guard band is 8 narrowband (15 kHz) subcarriers. For the 15/30 kHz or 30/60 kHz combination the guard band would be 10 narrowband subcarriers. In a 20 MHz system with around 1200 narrowband subcarriers the loss is less than 1%.

The described embodiments may be implemented in any appropriate type of communication system supporting any suitable communication standards and using any suitable components. As one example, certain embodiments may be implemented in a communication system such as that illustrated in FIG. 12. Although certain embodiments are described with respect to 3GPP systems and related terminology, the disclosed concepts are not limited to a 3GPP system. Additionally, although reference may be made to the term "cell", the described concepts may also apply in other contexts, such as beams used in Fifth Generation (5G) systems, for instance.

Figure 12:
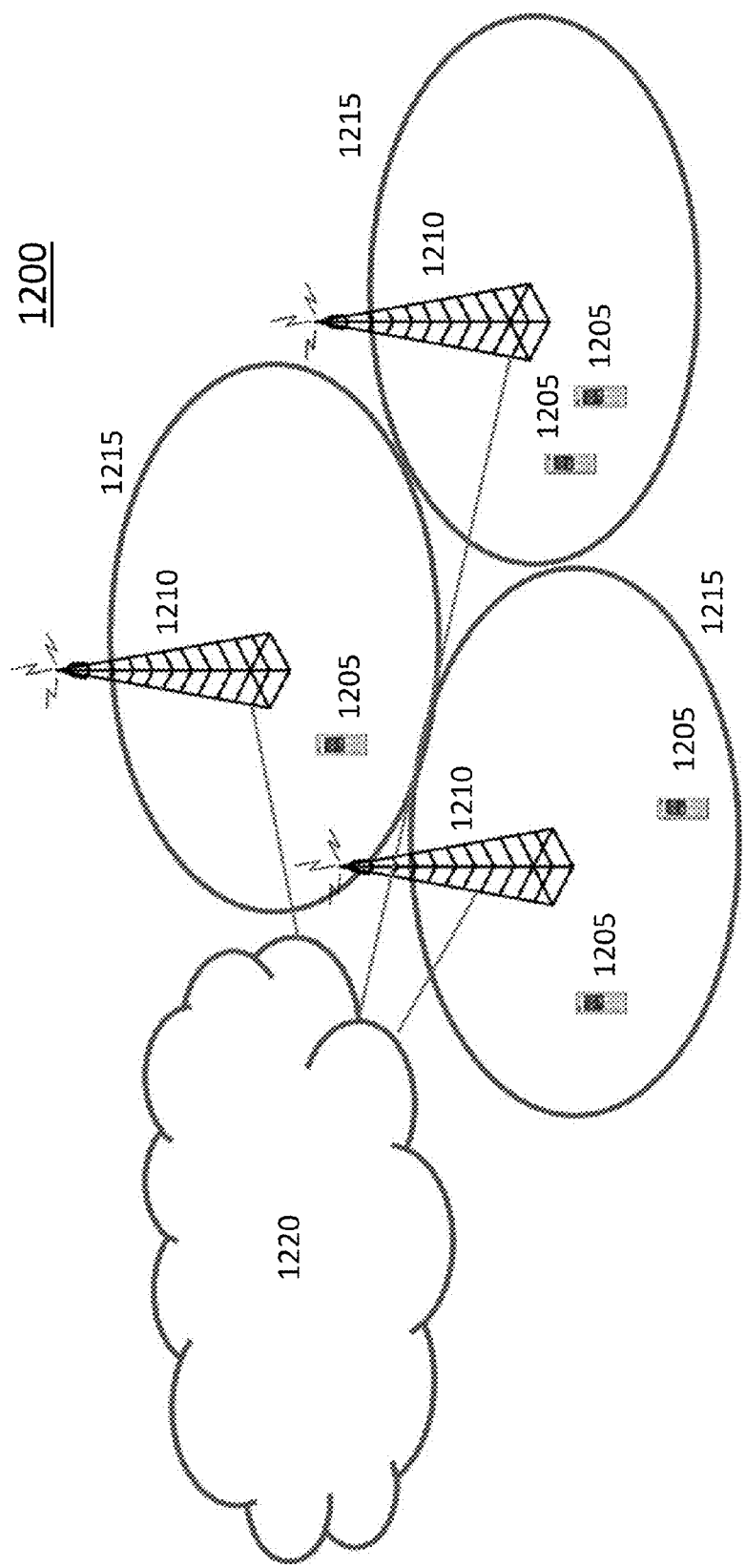
FIG. 12 illustrates communication system according to an embodiment of the disclosed subject matter.

Referring to FIG. 12, a communication network 1200 comprises a plurality of wireless communication devices 1205 (e.g., conventional UEs, machine type communication [MTC]/machine-to-machine [M2M] UEs) and a plurality of radio access nodes 1210 (e.g., eNodeBs, gNodeBs or other base stations). Communication network 1200 is organized into cell areas 1215 served by radio access nodes 1210, which are connected to a core network 1220. Radio access nodes 1210 are capable of communicating with wireless communication devices 1205 along with any additional elements suitable to support communication between wireless communication devices or between a wireless communication device and another communication device (such as a landline telephone).

Although wireless communication devices 1205 may represent communication devices that include any suitable combination of hardware and/or software, these wireless communication devices may, in certain embodiments, represent devices such as those illustrated in greater detail by FIGS. 13A and 13B. Similarly, although the illustrated radio access node may represent network nodes that include any suitable combination of hardware and/or software, these nodes may, in particular embodiments, represent devices such those illustrated in greater detail by FIGS. 14A, 14B and 15.

Referring to FIG. 13A, a wireless communication device 1300A comprises a processor or processing circuitry 1305 (e.g., Central Processing Units [CPUs], Application Specific Integrated Circuits [ASICs], Field Programmable Gate Arrays [FPGAs], and/or the like), a memory 1310, a transceiver 1315, and an antenna 1320. In certain embodiments, some or all of the functionality described as being provided by UEs, MTC or M2M devices, and/or any other types of wireless communication devices may be provided by the processing circuitry executing instructions stored on a computer-readable medium, such as memory 1310. Alternative embodiments may include additional components beyond those shown in FIG. 13A that may be responsible for providing certain aspects of the device's functionality, including any of the functionality described herein.

Referring to FIG. 13B, a wireless communication device 1300B comprises at least one module 1325 configured to perform one or more corresponding functions. Examples of such functions include various method steps or combinations of method steps as described herein with reference to wireless communication device(s). For instance, modules 1325 may comprise an addressing module configured to address physical resources as described above, and a transmitting and/or receiving module configured to transmit and/or receive information as described above. In general, a module may comprise any suitable combination of software and/or hardware configured to perform the corresponding function. For instance, in some embodiments a module comprises software configured to perform a corresponding function when executed on an associated platform, such as that illustrated in FIG. 13A.

Referring to FIG. 14A, a radio access node 1400A comprises a control system 1420 that comprises a node processor or processing circuitry 1405 (e.g., Central Processing Units (CPUs), Application Specific Integrated Circuits (ASICs), Field Programmable Gate Arrays (FPGAs), and/or the like), memory 1410, and a network interface 1415. In addition, radio access node 1400A comprises at least one radio unit 1425 comprising at least one transmitter 1435 and at least one receiver coupled to at least one antenna 1430. In some embodiments, radio unit 1425 is external to control system 1420 and connected to control system 1420 via, e.g., a wired connection (e.g., an optical cable). However, in some other embodiments, radio unit 1425 and potentially the antenna 1430 are integrated together with control system 1420. Node processor 1405 operates to provide at least one function 1445 of radio access node 1400A as described herein. In some embodiments, the function(s) are implemented in software that is stored, e.g., in the memory 1410 and executed by node processor 1405.

In certain embodiments, some or all of the functionality described as being provided by a base station, a node B, an enodeB, and/or any other type of network node may be provided by node processor 1405 executing instructions stored on a computer-readable medium, such as memory 1410 shown in FIG. 14A. Alternative embodiments of radio access node 1400 may comprise additional components to provide additional functionality, such as the functionality described herein and/or related supporting functionality.

Referring to FIG. 14B, a radio access node 1400B comprises at least one module 1450 configured to perform one or more corresponding functions. Examples of such functions include various method steps or combinations of method steps as described herein with reference to radio access node(s). For instance, modules 1450 may comprise an addressing module configured to address physical resources as described above, and a transmitting and/or receiving module configured to transmit and/or receive information as described above. In general, a module may comprise any suitable combination of software and/or hardware configured to perform the corresponding function. For instance, in some embodiments a module comprises software configured to perform a corresponding function when executed on an associated platform, such as that illustrated in FIG. 14A.

Figure 15:
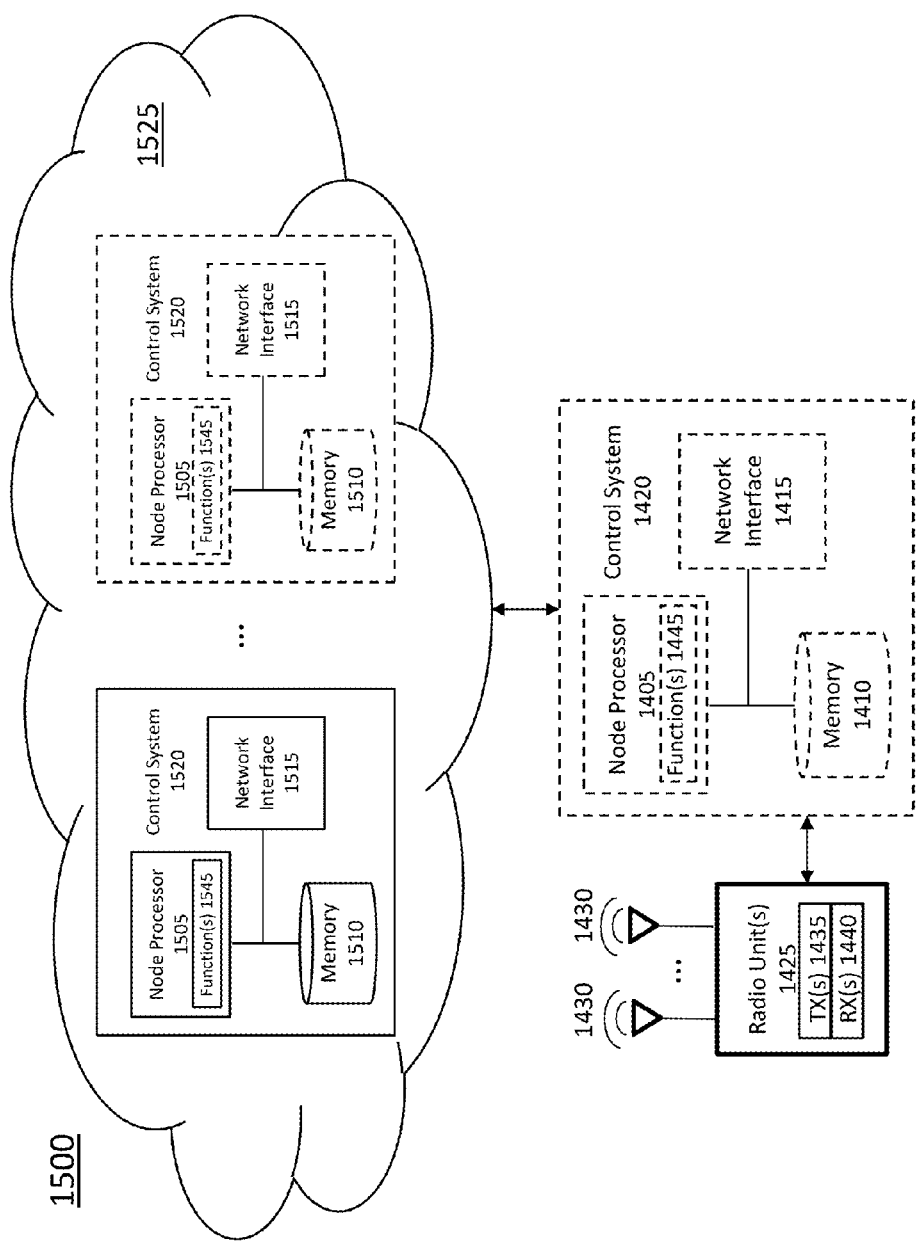
FIG. 15 illustrates a radio access node according to yet another embodiment of the disclosed subject matter.

FIG. 15 is a block diagram that illustrates a virtualized radio access node 1500 according to an embodiment of the disclosed subject matter. The concepts described in relation to FIG. 15 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 15, radio access node 1500 comprises control system 1420 as described in relation to FIG. 14A.

Control system 1420 is connected to one or more processing nodes 1520 coupled to or included as part of a network(s) 1525 via network interface 1415. Each processing node 1520 comprises one or more processors or processing circuitry 1505 (e.g., CPUs, ASICs, FPGAs, and/or the like), memory 1510, and a network interface 1515.

In this example, functions 1445 of radio access node 1400A described herein are implemented at the one or more processing nodes 1520 or distributed across control system 1420 and the one or more processing nodes 1520 in any desired manner. In some embodiments, some or all of the functions 1445 of radio access node 1400A described herein are implemented as virtual components executed by one or more virtual machines implemented in a virtual environment(s) hosted by processing node(s) 1520. As will be appreciated by one of ordinary skill in the art, additional signaling or communication between processing node(s) 1520 and control system 1420 is used in order to carry out at least some of the desired functions 1445. As indicated by dotted lines, in some embodiments control system 1420 may be omitted, in which case the radio unit(s) 1425 communicate directly with the processing node(s) 1520 via an appropriate network interface(s).

In some embodiments, a computer program comprises instructions which, when executed by processing circuitry, causes the processing circuitry to carry out the functionality of a radio access node (e.g., radio access node 1210 or 1400A) or another node (e.g., processing node 1520) implementing one or more of the functions of the radio access node in a virtual environment according to any of the embodiments described herein.

Figure 16:
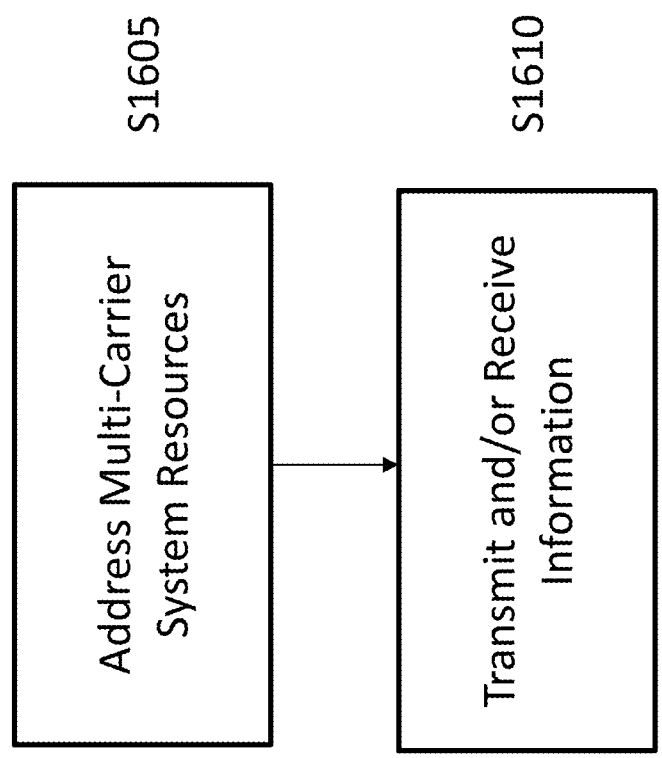
FIG. 16 is a flowchart illustrating a method of operating a wireless communication device or a radio access node according to an embodiment of the disclosed subject matter.

FIG. 16 is a flowchart illustrating a method of operating a wireless communication device or a radio access node according to an embodiment of the disclosed subject matter.

Referring to FIG. 16, the method comprises addressing multi-subcarrier system resources (S1605) using at least one of multiple different numerologies available within a single carrier, wherein the multiple different numerologies comprise a first numerology having resource blocks (RBs) with a first bandwidth and a first subcarrier spacing, $\Delta f1$, and a second numerology having RBs with a second bandwidth and a second subcarrier spacing, $\Delta f2$, which is different from $\Delta f1$, and wherein the first numerology is aligned in the frequency domain relative to a frequency reference, Fref, according to $m*\Delta f1+Fref$ and the second numerology is aligned in the frequency domain relative to the frequency reference, Fref, according to $n*\Delta f2+Fref$, where m and n are integers.

The method further comprises transmitting and/or receiving information within the single carrier according to the at least one of the multiple different numerologies (S1610).

The following acronyms, among others, are used in this description.

| | |
|---|---|
| 3GPP | Third Generation Partnership Project |
| EARFCN | EUTRA Absolute radio-frequency channel number |
| EUTRA | Evolved Universal Terrestrial Radio Access |
| LTE | Long Term Evolution |
| NX | 3GPP New Radio (alternatively, referred to as NR) |
| NX-ARFCN | Absolute Radio Frequency Channel Number |
| PSS | Primary Synchronization Signal |
| SSS | Secondary Synchronization Signal |
| UARFCN | UTRA Absolute Radio Frequency Channel Number |
| UTRA | Universal Terrestrial Radio Access |

As indicated by the foregoing, certain embodiments of the disclosed subject matter provide a resource allocation grid and/or addressing scheme defined for at least two numerologies that allow for proper co-existence in a system operating with mixed numerologies.

While the disclosed subject matter has been presented above with reference to various embodiments, it will be understood that various changes in form and details may be made to the described embodiments without departing from the overall scope of the disclosed subject matter.

The invention claimed is:

1. A method of operating a user equipment, comprising:
addressing multi-subcarrier system resources using at least one of multiple different numerologies available within a single carrier, wherein the multiple different numerologies comprise a first numerology having resource blocks (RBs) with a first bandwidth and a first subcarrier spacing, $\Delta f1$, and a second numerology having RBs with a second bandwidth and a second subcarrier spacing, $\Delta f2$, which is different from $\Delta f1$, and wherein the first numerology is aligned in the frequency domain relative to a frequency reference, Fref, according to $m*\Delta f1+Fref$ and the second numerology is aligned in the frequency domain relative to the frequency reference, Fref, according to $n*\Delta f2+Fref$, where m and n are integers; and
transmitting and/or receiving information within the single carrier according to the at least one of the multiple different numerologies,
wherein allocations on the multiple different numerologies are performed in neighboring nodes or on different beams transmitted from the same node.

2. The method of claim 1, wherein subcarriers of allocated RBs of the first numerology are separated from subcarriers of allocated RBs of the second numerology by a frequency gap having a size that is a function of $\Delta f1$ or $\Delta f2$.

3. The method of claim 1, wherein the first subcarrier spacing $\Delta f1$ is related to the second subcarrier spacing $\Delta f2$ by an integer scaling factor N such that $\Delta f2=N*\Delta f1$.

4. The method of claim 3, wherein $\Delta f1=15$ kHz and $\Delta f2=60$ kHz.

5. The method of claim 1, wherein the single carrier has a bandwidth of approximately 10 MHz or 20 MHz.

6. The method of claim 1, wherein the at least one of the multiple different numerologies comprises a plurality of different numerologies.

7. The method of claim 1, further comprising transmitting or receiving first and second integers B and D indicating a start frequency relative to a frequency reference and width of a first numerology among the multiple different numerologies, wherein the start frequency is defined according to $B*K1*\Delta f$, and the bandwidth of the first numerology is defined according to $D*K1*\Delta f$, wherein K1 denotes a bandwidth of a smallest addressable unit of the first numerology, expressed in units of a smallest subcarrier spacing of numerologies of the single carrier, and wherein $\Delta f$ denotes the smallest subcarrier spacing.

8. The method of claim 7, further comprising transmitting or receiving third and fourth integers A and C indicating a start frequency relative to a frequency reference and width of a second numerology among the multiple different numerologies, wherein the start frequency of the second numerology is defined according to $A*K2*\Delta f$, and the bandwidth of the second numerology is defined according to $C*K2*\Delta f$, wherein K2 denotes a bandwidth of a smallest addressable unit of the second numerology, expressed in units of the smallest subcarrier spacing of numerologies of the single carrier.

9. The method of claim 7, wherein the first through fourth integers are transmitted or received in downlink control information (DCI).

10. The method of claim 1, further comprising transmitting or receiving a bitmap indicating a resource allocation of each of the at least one of the multiple different numerologies.

11. A user equipment, comprising:
processing circuitry and memory collectively configured to address multi-subcarrier system resources using at least one of multiple different numerologies available within a single carrier, wherein the multiple different numerologies comprise a first numerology having resource blocks (RBs) with a first bandwidth and a first subcarrier spacing, $\Delta f1$, and a second numerology having RBs with a second bandwidth and a second subcarrier spacing, $\Delta f2$, which is different from $\Delta f1$, and wherein the first numerology is aligned in the frequency domain relative to a frequency reference, Fref, according to $m*\Delta f1+Fref$ and the second numerology is aligned in the frequency domain relative to the frequency reference, Fref, according to $n*\Delta f2+Fref$, where m and n are integers; and at least one transmitter and/or receiver configured to transmit and/or receive information within the single carrier according to the at least one of the multiple different numerologies, wherein allocations on the multiple different numerologies are performed in neighboring nodes or on different beams transmitted from the same node.

12. The user equipment of claim 11, wherein subcarriers of allocated RBs of the first numerology are separated from subcarriers of allocated RBs of the second numerology by a frequency gap having a size that is a function of $\Delta f1$ or $\Delta f2$.

13. The user equipment of claim 11, wherein the first subcarrier spacing $\Delta f1$ is related to the second subcarrier spacing $\Delta f2$ by an integer scaling factor N such that $\Delta f2=N*\Delta f1$.

14. The user equipment of claim 13, wherein $\Delta f1=15$ kHz and $\Delta f2=60$ kHz.

15. The user equipment of claim 11, wherein the single carrier has a bandwidth of approximately 10 MHz or 20 MHz.

16. The user equipment of claim 11, wherein the at least one of the multiple different numerologies comprises a plurality of different numerologies.

17. The user equipment of claim 11, wherein the at least one transmitter and/or receiver is further configured to transmit and/or receive first and second integers B and D indicating a start frequency relative to a frequency reference and width of a first numerology among the multiple different numerologies, wherein the start frequency is defined according to $B*K1*\Delta f$, and the bandwidth of the first numerology is defined according to $D*K1*\Delta f$, wherein K1 denotes a bandwidth of a smallest addressable unit of the first numerology, expressed in units of a smallest subcarrier spacing of numerologies of the single carrier, and wherein $\Delta f$ denotes the smallest subcarrier spacing.

18. The user equipment of claim 17, wherein the at least one transmitter and/or receiver is further configured to transmit and/or receive third and fourth integers A and C indicating a start frequency relative to a frequency reference and width of a second numerology among the multiple different numerologies, wherein the start frequency of the second numerology is defined according to $A*K2*\Delta f$, and the bandwidth of the second numerology is defined according to $C*K2*\Delta f$, wherein K2 denotes a bandwidth of a smallest addressable unit of the second numerology, expressed in units of the smallest subcarrier spacing of numerologies of the single carrier.

19. The user equipment of claim 17, wherein the first through fourth integers are transmitted or received in downlink control information (DCI).

20. The user equipment of claim 19, wherein the at least one transmitter and/or receiver is further configured to transmit or receive a bitmap indicating a resource allocation of each of the at least one of the multiple different numerologies.

* * * * *

UNITED STATES PATENT AND TRADEMARK OFFICE
CERTIFICATE OF CORRECTION

PATENT NO. : 10,111,229 B2  
APPLICATION NO. : 15/784968  
DATED : October 23, 2018  
INVENTOR(S) : Werner et al.

Page 1 of 1

It is certified that error appears in the above-identified patent and that said Letters Patent is hereby corrected as shown below:

In the Specification

Column 1, Line 8, delete "2017," and insert -- 2017, now Pat. No. 9,820,281, --, therefor.

Column 2, Line 7, delete "wherein of" and insert -- wherein $\Delta f$ --, therefor.

Column 3, Line 3, delete "wherein of" and insert -- wherein $\Delta f$ --, therefor.

Signed and Sealed this  
Nineteenth Day of March, 2019

Andrei Iancu  
*Director of the United States Patent and Trademark Office*